US011946426B2

(12) United States Patent
Eloy et al.

(10) Patent No.: US 11,946,426 B2
(45) Date of Patent: Apr. 2, 2024

(54) CONTROL OF A VARIABLE VALVE TIMING

(71) Applicant: Vitesco Technologies GmbH, Regensburg (DE)

(72) Inventors: Stéphane Eloy, Toulouse (FR); Fabien Joseph, Toulouse (FR)

(73) Assignee: Vitesco Technologies GmbH (DE)

( * ) Notice: Subject to any disclaimer, the term of this patent is extended or adjusted under 35 U.S.C. 154(b) by 0 days.

(21) Appl. No.: 18/275,870

(22) PCT Filed: Feb. 3, 2022

(86) PCT No.: PCT/EP2022/052597

§ 371 (c)(1),
(2) Date: Aug. 4, 2023

(87) PCT Pub. No.: WO2022/175101

PCT Pub. Date: Aug. 25, 2022

(65) Prior Publication Data

US 2024/0035423 A1 Feb. 1, 2024

(30) Foreign Application Priority Data

Feb. 18, 2021 (FR) ....................................... 2101597

(51) Int. Cl.
*F02D 41/00* (2006.01)
*F02D 41/14* (2006.01)

(52) U.S. Cl.
CPC ....... *F02D 41/009* (2013.01); *F02D 41/0097* (2013.01); *F02D 41/1497* (2013.01); *F02D 2041/001* (2013.01)

(58) Field of Classification Search
CPC ............... F02D 41/009; F02D 41/0097; F02D 41/1497; F02D 2041/001
See application file for complete search history.

(56) References Cited

U.S. PATENT DOCUMENTS

| | | | | |
|---|---|---|---|---|
| 6,283,105 | B1 * | 9/2001 | Kasai | F02D 41/009 123/672 |
| 6,318,313 | B1 | 11/2001 | Moriya et al. | |
| 6,505,586 | B1 | 1/2003 | Sato et al. | |
| 9,243,574 | B2 | 1/2016 | Nishida et al. | |
| 9,347,413 | B2 | 5/2016 | Schüle et al. | |
| 10,030,549 | B2 * | 7/2018 | Baek | H04L 12/413 |
| 10,480,444 | B2 | 11/2019 | Stewart et al. | |

(Continued)

FOREIGN PATENT DOCUMENTS

| | | | |
|---|---|---|---|
| DE | 102007037582 | A1 | 2/2008 |
| DE | 102015007973 | A1 | 12/2016 |

(Continued)

OTHER PUBLICATIONS

English Translation of the Written Opinion for International Application No. PCT/EP2022/052597, dated May 10, 2022, 5 pages.

(Continued)

*Primary Examiner* — Freddie Kirkland, III
(74) *Attorney, Agent, or Firm* — Buchanan Ingersoll & Rooney PC

(57) ABSTRACT

A method for controlling a variable valve timing system using minimum speed positions. The minimum speed positions allow the movement and the position of the various camshafts to be controlled.

10 Claims, 1 Drawing Sheet

(56) References Cited

U.S. PATENT DOCUMENTS

| | | | | |
|---|---|---|---|---|
| 10,731,582 | B2 * | 8/2020 | Kalweit | F02D 41/1497 |
| 2006/0081203 | A1 * | 4/2006 | Izumi | F02D 13/0219<br>123/348 |
| 2011/0191006 | A1 | 8/2011 | Nishida et al. | |

FOREIGN PATENT DOCUMENTS

| | | | |
|---|---|---|---|
| EP | 1010876 | A2 | 6/2000 |
| JP | 2005351211 | A | 12/2005 |

OTHER PUBLICATIONS

International Search Report and Written Opinion for International Application No. PCT/EP2022/052597, dated May 10, 2022, 9 pages.

International Search Report and Written Opinion for International Application No. PCT/EP2022/052597, dated May 10, 2022, 14 pages (French).

* cited by examiner

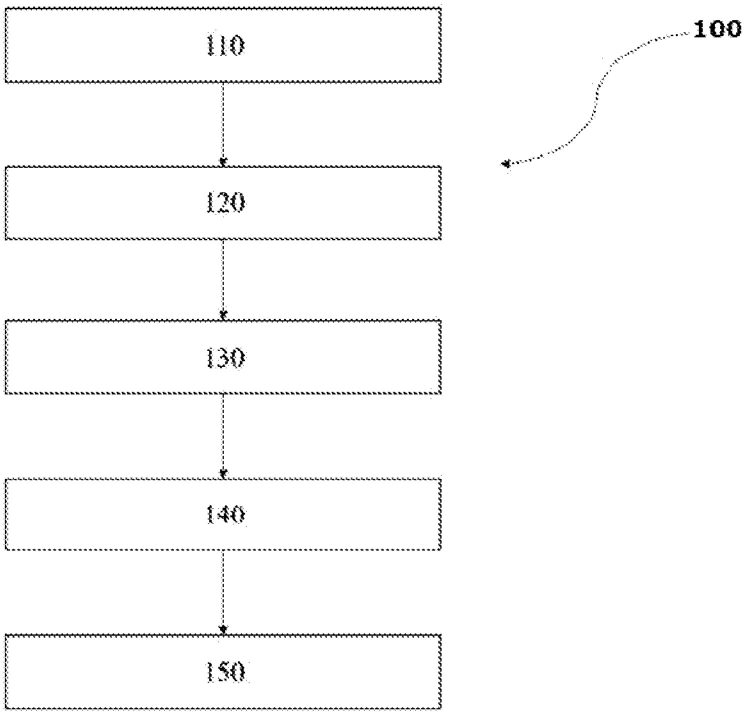
100
110
120
130
140
150

CONTROL OF A VARIABLE VALVE TIMING

CROSS REFERENCE TO RELATED APPLICATIONS

This application is the U.S. National Phase Application of PCT International Application No. PCT/EP2022/052597, filed Feb. 3, 2022, which claims priority to French Patent Application No. 2101597, filed Feb. 18, 2021, the contents of such applications being incorporated by reference herein.

FIELD OF THE INVENTION

The present invention relates to a method for controlling a variable valve timing system of a heat engine.

BACKGROUND OF THE INVENTION

Many heat engines have a variable valve timing (VVT) system. The variable valve timing system allows, for example, the instants associated with opening and closing the intake and exhaust valves of a heat engine to be adapted as a function of operating parameters. This particularly allows the efficiency of the engine to be improved and the pollution associated with its operation to be reduced.

Variable valve timing involves, among other things, phase shifting an angular position of an intake camshaft and/or of an exhaust camshaft in one direction or in the other direction relative to an angular position of a crankshaft of the engine.

Controlling an angular value of the phase shift of a camshaft relative to a determined position of the crankshaft in a variable valve timing system is usually carried out by virtue of a target of the camshaft coupled to a position sensor of the camshaft.

Consequently, when a position signal of the camshaft is no longer available, for example, due to a fault in the position sensor, the variable valve timing system for this camshaft is deactivated.

This situation therefore can be improved.

SUMMARY OF THE INVENTION

A first aim of the present disclosure is to therefore propose a method for controlling a variable valve timing system allowing a variable valve timing system of an engine to be controlled without information concerning the position of targets of the various camshafts.

A second aim of the present disclosure is to propose a variable valve timing system in which the camshafts are devoid of targets and of position sensors for camshafts.

In this respect, an aspect of the invention presents a method for controlling a variable valve timing system, the variable valve timing system comprising one or more intake camshaft(s) and one or more exhaust camshaft(s) and a crankshaft, characterized in that it comprises the following steps:

- determining a reference minimum speed position of the crankshaft associated with a current phase shift of a specific camshaft;
- controlling a phase shift of the specific camshaft relative to the crankshaft;
- determining a specific minimum speed position, the specific minimum speed position corresponding to an angular position of the crankshaft during a cycle for which the speed of rotation of the crankshaft passes through a minimum;

- determining a difference in the specific minimum speed position between the specific minimum speed position and the reference minimum speed position;
- determining a phase shift of the specific camshaft relative to the crankshaft on the basis of the difference in the specific minimum speed position.

Optionally, the reference minimum speed position is associated with an angular position of the specific camshaft corresponding to a basic phase shift of the specific camshaft relative to the crankshaft.

Optionally, the method is implemented as long as a difference between the controlled phase shift and the determined phase shift is greater than a predetermined threshold.

Optionally, controlling a phase shift of the specific camshaft comprises estimating a minimum control speed position, the minimum control speed position corresponding to the reference minimum speed position of the crankshaft to which a variation in the minimum speed position is added, with the variation in the minimum speed position corresponding to a difference between the current phase shift and the controlled phase shift of the specific camshaft.

Optionally, determining the phase shift of the specific camshaft comprises a correspondence between the difference in the specific minimum speed position and a difference in the phase shift of the specific camshaft.

An aspect of the invention also relates to a computer program product comprising program code instructions recorded on a computer-readable medium such as a processor, a controller or a microcontroller for implementing the steps of a method according to an aspect of the invention in the present disclosure when said program is implemented by said computer such as a processor, a controller or a microcontroller.

An aspect of the invention also presents a variable valve timing system comprising an intake camshaft and an exhaust camshaft comprising a computer configured to implement one of the methods for controlling a variable valve timing system presented by the present disclosure.

Optionally, the variable valve timing system is devoid of a camshaft target and of a camshaft position sensor.

This variable valve timing system also can be incorporated in a heat engine configured to charge an electrical energy storage means when it is operating. A heat engine of this type can be included in an electrically powered vehicle.

An aspect of the invention thus allows a variable valve timing system of a heat engine to be controlled based on the evolution of a minimum speed. The variable valve timing system can remain activated for a camshaft even in the event of a fault in a position signal of said considered camshaft, since the minimum speed position allows the phase shift of the camshaft to be found relative to its initial position and allows its movement to be controlled. Therefore, an aspect of the invention can act both as a redundant control system of a variable valve timing system of a heat engine and also as an alternative to the traditional control of the variable valve timing system.

In this case, the method according to an aspect of the invention allows a variable valve timing system devoid of a camshaft target and of a position sensor for the various camshafts to be controlled, which results in a significant reduction in the cost of the variable valve timing system and, by extension, of the heat engine. This new system and its associated method are particularly advantageous for heat engines intended to operate at one or more constant operating points.

BRIEF DESCRIPTION OF THE DRAWINGS

Further features, details and advantages will become apparent upon reading the following detailed description, and with reference to the appended drawing, in which:
The FIGURE shows an example of a method for controlling a variable valve timing system.

DETAILED DESCRIPTION OF THE PREFERRED EMBODIMENTS

The present disclosure presents a method for controlling a variable valve timing system implemented in an internal combustion heat engine (hereafter called heat engine). It is particularly advantageous for engines of the “range extender” type. An engine of the “range extender” type is a heat engine configured to supply an electrical energy storage means, and in particular an electric battery, which can supply an electric motor allowing propulsion of an electrically powered vehicle. In particular, an engine of the “range extender” type is not connected to the wheels of a vehicle when it operates and, as a result, is used at well known and limited operating points.

A variable valve timing system can include one or more intake camshafts and one or more exhaust camshafts. The variable valve timing system can also include camshaft targets, each associated with a camshaft, as well as position sensors, with each position sensor being associated with a target.

The intake camshafts each include cams associated with valves, with one or more intake valves being associated with each combustion cylinder of the heat engine. When the intake valves associated with a combustion cylinder are open, fluid communication occurs between an intake of the heat engine and the combustion cylinder, i.e., fluid communication is established between an air intake channel of the heat engine and the combustion cylinder.

The exhaust camshafts each include cams associated with valves, with one or more exhaust valves being associated with each combustion cylinder of the heat engine. When the exhaust valves associated with a combustion cylinder are open, fluid communication occurs between an exhaust of the heat engine and the combustion cylinder, i.e., fluid communication is established between an outlet channel for the exhaust gases of the heat engine and the combustion cylinder.

The variable valve timing system can also include a computer such as a processor, a controller, or a microcontroller adapted to control any one of the methods presented by the present disclosure. The computer can also comprise a memory or have access to a memory, which particularly can be configured to store code instructions allowing any one of the presented methods to be executed.

The variable valve timing system is a system that introduces a phase shift between a crankshaft and one or more camshafts of the heat engine. Phase shifting a camshaft relative to the crankshaft must be understood in the present application as an angular offset of an angular position of an intake camshaft and/or of an exhaust camshaft in one direction or in the other direction relative to an angular position of a crankshaft of the engine. The phase shift can be expressed, for example, in degrees)(° or in radians (rad). This phase shift allows opening of the valves of the corresponding camshaft to be offset relative to a reference angular position of the heat engine, particularly in order to achieve better combustion in the combustion cylinders.

Throughout the remainder of the present application, the “basic phase shift” of a camshaft will refer to a neutral angular position of the camshaft, i.e., an angular position of the camshaft when said camshaft is not phase shifted (or has a phase shift of 0°) relative to the crankshaft. The position of the camshaft is generally controlled by a hydraulic system. The neutral angular position of the camshaft is then the position of the camshaft when the hydraulic system is not supplied with pressurized fluid. In other words, an angular position of a camshaft comprising a basic phase shift with its crankshaft in a heat engine comprising a variable valve timing system would correspond to the angular position of the camshaft relative to its crankshaft of the same heat engine if it did not comprise a variable valve timing system.

Reference will now be made to the FIGURE, which shows an example of a method 100 for controlling a variable valve timing system using minimum speed positions.

According to the present disclosure, “minimum speed position” denotes an angular position of the crankshaft for which the crankshaft passes through a minimum rotation speed during a cycle of the engine. In this case, for an engine comprising n cylinders, the engine also comprises n minimum speed positions, each being associated with a combustion cylinder and each being located between two consecutive bottom dead centers of a piston moving in said cylinder in the vicinity of a top dead center at the end of compression. Therefore, a minimum speed position can be determined as being the offset of an angular position of the crankshaft for which the speed of rotation of the crankshaft is minimal relative to the top dead center at the end of the corresponding compression and it is possible to take an average value of the minimum speed positions (offsets) associated with each cylinder during said engine cycle as a minimum speed position value for an engine cycle.

A minimum speed position particularly can be computed on the basis of measurements of a crankshaft position sensor. For example, a linear regression method can be used, such as the least squares method, for determining a minimum speed position on the basis of the measurements of the position of the crankshaft.

Surprisingly, the inventors have noted that a phase shift of a camshaft at an operating point of the heat engine resulted in a modification of the minimum speed position of the heat engine. They then established a correlation between a movement of the minimum speed position and an angular movement of a camshaft relative to the crankshaft as a function of the operating point. An operating point of a heat engine includes an engine load and an engine speed.

As illustrated by block 110, the method can include determining a reference minimum speed position associated with a current phase shift (at a current offset angular position of the camshaft relative to the crankshaft) of a specific camshaft (intake or exhaust). The current phase shift of the camshaft denotes the phase shift of the camshaft before the next control of phase shift. The specific camshaft corresponds to the camshaft for which a phase shift will be controlled throughout the remainder of the method. The current phase shift of the specific camshaft therefore corresponds to the phase shift of the specific camshaft preceding the control of the phase shift of said specific camshaft initiated throughout the remainder of the method.

In this case, the current phase shift of the specific camshaft is known. It corresponds to the last phase shift of the specific camshaft determined by the method.

In examples, the current phase shift can correspond to the basic phase shift of the specific camshaft. In this case, the specific camshaft is returned to its basic phase shift position (without phase shift with the crankshaft) before each new control of the phase shift of the specific camshaft. This particularly allows the precision of the control of the variable valve timing system to be improved.

The reference minimum speed position thus can be associated with a basic phase shift of the specific camshaft relative to the crankshaft.

The reference minimum speed position of the specific camshaft evolves as a function of the position of other camshafts of the variable valve timing system which, due to their respective phase shift, also causes the minimum speed position, and therefore the reference minimum speed position of the specific camshaft, to evolve.

In other words, when the reference minimum speed position of the specific camshaft is determined as corresponding to the basic phase shift of the specific camshaft (0° phase shift with the crankshaft), it is not the same, in a first case, where all the other camshafts have the basic phase shift (therefore all the camshafts have a 0° phase shift with the crankshaft as if there were no variable valve timing system) and, in a second case, where at least one of the other camshafts has a phase shift other than the basic phase shift with the crankshaft for a given operating point.

More generally, the minimum speed position evolves as a function of the operating point and therefore as a function of the engine speed and of the engine load.

The reference minimum speed position can be determined, for example, on the basis of measurements of the position of the crankshaft and then associated with the current angular position of the specific camshaft.

As illustrated by block 120, the method 100 can include controlling a phase shift of the specific camshaft relative to the crankshaft.

Controlling a phase shift of the specific camshaft can include estimating a minimum control speed position. The minimum control speed position corresponds to the reference minimum speed position to which a variation in the minimum speed position is added. The variation in the minimum speed position corresponds to a difference between the current phase shift (starting position) and the controlled phase shift (arrival position) of the specific camshaft.

In examples, the memory of the control system thus can include a phase shift variations table that matches variations in the phase shifts of camshafts to variations in minimum speed positions.

In examples, each phase shift variations table can include two sub-tables, with one being associated with the variations in the phase shift of the intake camshafts and the other being associated with the variations in the phase shift of the exhaust camshafts.

In examples, a plurality of phase shift variation tables exists, each associated with an engine speed and an engine load.

Controlling a phase shift of a specific camshaft therefore can include selecting, from a specific phase shift variations table, a variation in the minimum speed position for which the variation in the phase shift of an associated camshaft is closest to the difference between the current phase shift and the controlled phase shift of the specific camshaft.

The specific phase shift variations table can be the sub-table of variations in the phase shifts associated with the same type (intake or exhaust) of camshaft as the specific camshaft and for which the engine speed and the engine load are closest to the current speed and the current engine load when executing the method.

As illustrated by block 130, the method 100 can include determining a specific minimum speed position. The specific minimum speed position corresponds to the minimum speed position after controlling the phase shift of the specific camshaft. The specific minimum speed position therefore can be determined on the basis of measurements of positions of the crankshaft carried out by a crankshaft position sensor after controlling the phase shift.

As illustrated by block 140, the method 100 can include determining a difference in the specific minimum speed position between the specific minimum speed position and the reference minimum speed position.

The difference in the specific minimum speed position can correspond to a difference between the specific minimum speed position and the reference minimum speed position. As explained above, the modification of the minimum speed position is correlated with the phase shift of the camshafts. The difference in the minimum speed position in this case therefore translates the phase shift of the specific camshaft between the instant before the command (represented by the reference minimum speed) and the instant after the command (represented by the specific minimum speed position).

As illustrated by block 150, the method 100 can include determining a phase shift of the specific camshaft relative to the crankshaft on the basis of the difference in the specific speed minimum positions.

Determining the phase shift of the specific camshaft can include a correspondence between a difference in the minimum speed position (i.e., a variation in minimum speed positions) and a difference in the phase shift of the specific camshaft (i.e., a variation in the phase shifts of the specific camshaft relative to the crankshaft).

Thus, determining a phase shift of the specific camshaft can include selecting a camshaft phase shift variation in a specific phase shift variation table.

The camshaft phase shift variation can be selected from the specific phase shift variation table as being the camshaft phase shift variation associated with the minimum speed position variation closest to the difference in specific minimum speed positions.

The specific phase shift variation table can correspond to the phase shift variation sub-table corresponding to the same type of camshaft (intake or exhaust) as the specific camshaft and for which the engine speed and the engine load are closest to the current speed and the current engine load when executing the method.

It is thus possible to determine an angular position of the specific camshaft on the basis of the variation in the phase shifts of the specific camshaft (translating the angular movement of the specific camshaft relative to the crankshaft) and on the basis of the current position of the specific camshaft before controlling the phase shift (translating the starting angular position of the specific camshaft).

For example, the phase shift of the camshaft determined at the end of block 150 can be equal to the current phase shift of the camshaft before controlling the phase shift to which the variation in the phase shift of the selected specific camshaft is added.

In examples, it is also possible to contemplate using various linear interpolations on the basis of the various tables available in the memory and of the various points included in said tables for determining a variation in minimum speed positions or a variation in the phase shift of the specific camshaft more precisely than by selecting the closest point.

In examples, the method presented above is implemented as long as a difference between the controlled phase shift of the specific camshaft illustrated by block 110 and the determined phase shift of the specific camshaft illustrated by block 150 is greater than a predetermined threshold. The predetermined threshold can range, for example, between 1 and 10% of the angular phase shift position of the controlled camshaft and advantageously can be less than 5%.

An aspect of the invention therefore allows a variable valve timing system to be controlled based on minimum speed positions. This particularly allows a method for controlling a variable valve timing system to be provided as an alternative to the existing control method based on targets and position sensors of the camshafts. In this respect, these two solutions can exist in parallel and thus provide redundancy for the method for controlling a variable valve timing system in order to better control the heat engine.

An aspect of the invention also allows the variable valve timing system to be simplified, in particular for engines of the "range extender" type, since the system no longer requires the inclusion of a target for each camshaft, as well as an associated position sensor, in order to operate. In this way, the variable valve timing system according to an aspect of the invention is rendered less expensive and, insofar as it comprises fewer elements, more resilient.

The invention claimed is:

1. A method for controlling a variable valve timing system, the variable valve timing system comprising one or more intake camshaft(s) and one or more exhaust camshaft(s) and a crankshaft, the method comprising:

- determining a reference minimum speed position of the crankshaft associated with a current phase shift of a specific camshaft;
- controlling a phase shift of the specific camshaft relative to the crankshaft;
- determining a specific minimum speed position, the specific minimum speed position corresponding to an angular position of the crankshaft during a cycle for which the speed of rotation of the crankshaft passes through a minimum;
- determining a difference in the specific minimum speed position between the specific minimum speed position and the reference minimum speed position; and
- determining a phase shift of the specific camshaft relative to the crankshaft on the basis of the difference in the specific minimum speed position.

2. The method as claimed in claim 1, wherein the reference minimum speed position is associated with an angular position of the specific camshaft corresponding to a basic phase shift of the specific camshaft relative to the crankshaft.

3. The method as claimed in claim 1, wherein the method is implemented as long as a difference between the controlled phase shift and the determined phase shift is greater than a predetermined threshold.

4. The method as claimed in claim 1, wherein controlling a phase shift of the specific camshaft comprises estimating a minimum control speed position, the minimum control speed position corresponding to the reference minimum speed position of the crankshaft to which a variation in the minimum speed position is added, with the variation in the minimum speed position corresponding to a difference between the current phase shift and the controlled phase shift of the specific camshaft.

5. The method as claimed in claim 1, wherein determining the phase shift of the specific camshaft comprises a correspondence between the difference in the specific minimum speed position and a difference in the phase shift of the specific camshaft.

6. A computer program product comprising program code instructions recorded on a computer-readable medium such as a processor, a controller or a microcontroller for implementing the steps of the method as claimed in claim 1 when said program is implemented by said computer such as a processor, a controller or a microcontroller.

7. A variable valve timing system comprising an intake camshaft and an exhaust camshaft, characterized in that it comprises a computer configured to implement a method for controlling a variable valve timing system as claimed in claim 1.

8. The system as claimed in claim 7 the system is devoid of a camshaft target and of a camshaft position sensor.

9. A heat engine, comprising a variable valve timing system as claimed in claim 7, and configured to charge an electrical energy storage means when it is operating.

10. A vehicle comprising an electric propulsion means and comprising a heat engine as claimed in claim 9.

* * * * *